United States Patent Office 2,929,243
Patented Mar. 22, 1960

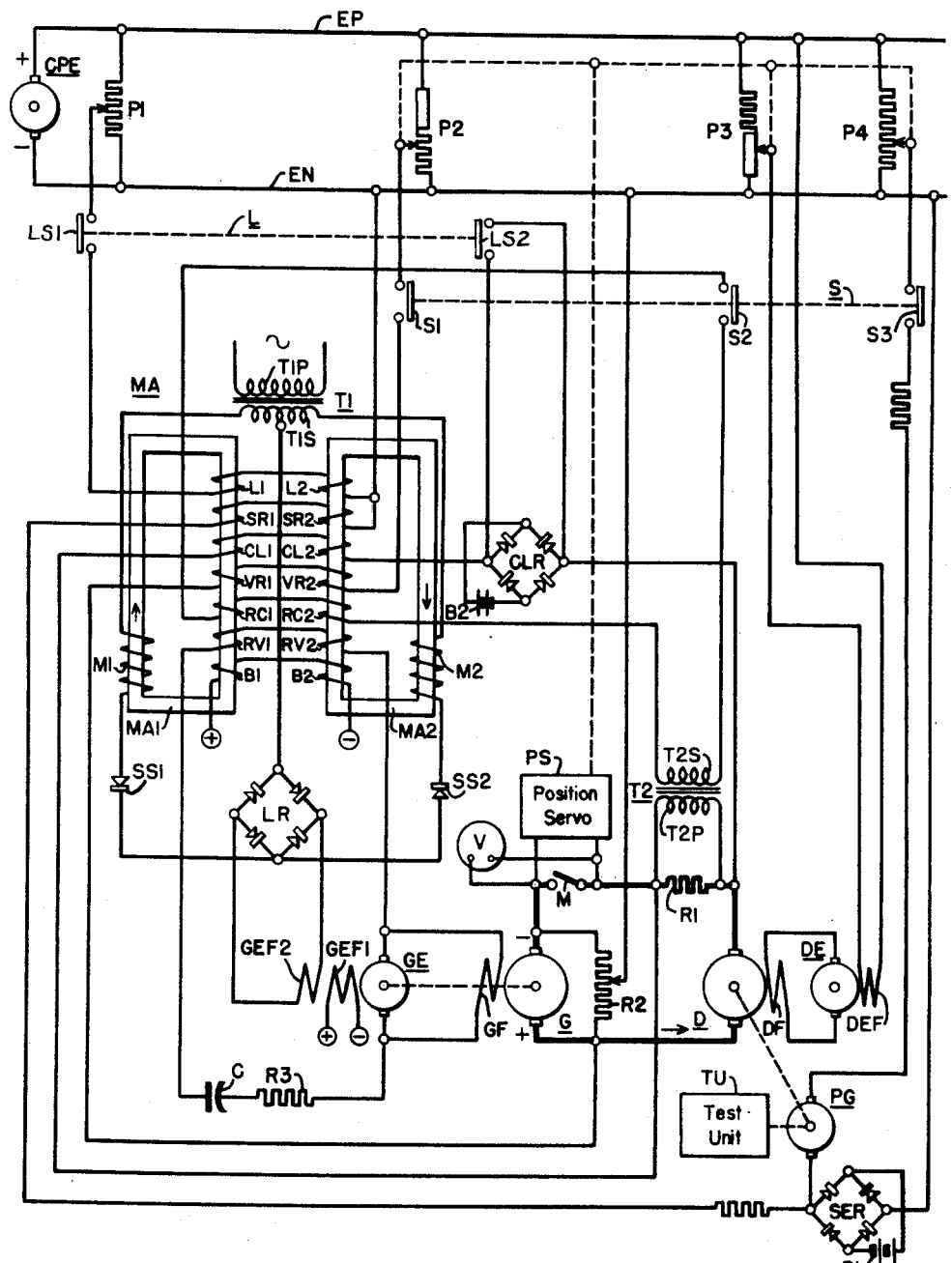

2,929,243

DYNAMOMETER CONTROL

Frank Slamar, Monroeville, Pa., assignor to Westinghouse Electric Corporation, East Pittsburgh, Pa., a corporation of Pennsylvania Application November 8, 1955, Serial No. 545,725

8 Claims. (Cl. 73—116)

This invention relates, generally, to systems of control for electric motors and, more particularly, to such systems wherein the motor is employed as a dynamometer used in motoring and load-absorbing modes of operation, among others.

A dynamometer is a device that may be used to measure either the torque delivered by an engine or motor, or the torque required to drive such an engine or motor, or, more generally, any piece of rotating machinery.

The usual electric dynamometer is a D.-C. or A.-C. motor having its frame mounted on trunnion bearings so it is free to rotate. Free rotation is prevented in most instances by means of a lever arm, the free end of which is spring-loaded as by a conventional calibrated coil spring assembly or, more commonly, a platform type of scale, which measures the force required to restrain the end of the lever which, with the length of the lever arm to the center of rotation, indicates torque. Horsepower determinations are made from the product of torque and speed. Since all measurements must be accurate, an accurate speed indicating tachometer or pilot generator is connected to the dynamometer for this purpose. When special speed regulating control is required, the usual practice is to use a tachometer or pilot generator belted or otherwise suitably connected to the dynamometer shaft to be driven thereby at a speed proportional to shaft speed. The signal generated by this pilot generator is then fed back into the system to regulate the dynamometer speed. Dynamometers which are to be used over a broad speed range are usually of the direct-current motor type becaue of the ease of controlling such devices through armature voltage control and field voltage control beyond the armature voltage range. The alternating current types are primarily adapted for single-speed special-purpose applications.

The invention as herein disclosed illustrates a control arrangement for a direct-current type of electric motor dynamometer, and in the interest of simplicity in representing the arrangement in the drawing, the mechanical details of the dynamometer, such as the rotatably mounted frame, lever arm and platform scale, are not shown. Such details are simple in nature and are readily appreciated from the discussion above.

Typical of the application of a dynamometer is its application in the testing of automobile engines and chassis. A dynamometer employed in automotive testing must be a versatile device. It must be capable of testing all of the components of the vehicle which affect its performance and its serviceability. For example, the dynamometer must be capable of testing the engine for friction loading, for output torque, for horsepower and, if a governor is employed, for the governor characteristics. It must be capable of testing transmissions and axles as well as the vehicle chassis. In accomplishing this, the requirements of the dynamometer are that it be capable of operating in both motoring and load-absorbing control modes. For example, in regard to engine tests, it is necessary to crank the engine with the dynamometer in order to start the engine when load-absorbing tests are to be made to determine engine output torques and horsepower. This means that the dynamometer must first be operated as a motor to drive and crank the engine and thereafter operated as a load-absorbing generator to apply torques of predetermined character to the engine. These torques may be constant in nature or they may vary in some suitable manner to simulate conditions such as ascending or descending grades and acceleration conditions. In the motoring mode, the dynamometer is also used to drive the engine to determine the friction drag of the engine from the torque required to drive it. In this mode, the engine delivers no power.

In transmission testing, two dynamometers are required, one operating in the motoring mode connected to the input shaft of the transmission, and one operating in the load-absorbing mode connected to the output shaft of the transmission. By this arrangement, accurate information relating to friction losses and, in general, the torque transmission capabilities of the transmission at various speeds are readily determined.

In still another mode of operation, the dynamometer rotor may be required only to function as a flywheel on the engine. In this mode, after the test engine has been cranked and started by the dynamometer, the dynamometer load is reduced to zero, and then the electrical connection between the dynamometer and the control therefor is broken or opened, so that the dynamometer functions essentially as a flywheel on the test engine.

The foregoing represent but a few of the applications of the dynamometer in vehicle component test procedures. This disclosure, while directed to improvements in a dynamometer control, is presented in extremely simplified form, especially in regard to the diagrammatic illustration of the system, and for this reason, many of the system arrangements whereby various types of control may be effected are not included; primarily, the illustrations are limited to an arrangement wherein the dynamometer may be operated as a motor to crank the test engine to start it or to drive the test engine to determine friction losses and the like, to function as a load-absorbing unit, to load the test engine under conditions of constant torque or constant speed, and to function as a flywheel on the test engine while the test engine is being examined for noises, vibration, adjustment and other mechanical problems prior to the beginning of a run of tests with the dynamometer.

In certain of its respects, this invention is related to a copending application of W. G. Roman et al., Serial No. 421,046, entitled "Dynamometer Control," filed on April 5, 1954, issued March 12, 1957, as Patent No. 2,785,367, and assigned to the assignee of this invention. This copending application covers complete test procedures with dynamometer apparatus of this general nature, and further information regarding the application of such a dynamometer control, as herein disclosed, may be had upon reference to the aforesaid copending application.

One object of this invention is to provide a dynamometer which is simple with respect to accuracy requirements and operational requirements.

Another object of this invention is to provide a dynamometer arrangement which is adjustable for constant torque control.

Yet another object of this invention is to provide a dynamometer control which is adjustable for constant speed control.

A further object of this invention is to provide a dynamometer arrangement utilizing current limit control to protect the system.

More particularly, it is an object of this invention to provide a dynamometer arrangement which may be utilized to crank a test engine and which thereafter may be disconnected from the test engine to function as a flywheel load thereon, wherein provision is made for regulating the voltage of the direct-current generator supplying the dynamometer during the interval in which it is disconnected from the dynamometer, so that the generator voltage may be made substantially equal to the dynamometer voltage prior to reconnection of the generator to the dynamometer.

Still another object of this invention is to provide a dynamometer control of rugged, durable nature which utilizes a static electromagnetic type of amplifier for combining the various control signals and providing the necessary output for adequately controlling the system.

With regard to the preceding object, it is an object hereof to provide a suitable feedback arrangement for the electromagnetic type of amplifier wherein disturbances originating in the said amplifier are minimized, thereby minimizing torque scale variations of control origin.

The foregoing statements are merely illustrative of the various aims and objects of this invention. Other objects and advantages will become apparent from a study of the following specification when considered in conjunction with the accompanying drawing, in which the single figure thereof diagrammatically illustrates an electric motor type of dynamometer control system embodying the principles of this invention.

The dynamometer system comprises a dynamometer D which includes a direct-current motor having an armature winding and a field winding, the latter being designated DF. As noted in the opening statements hereof, the motor frame (not shown) is journaled in bearings and suitably restrained so that angular deflection of the frame in either load-absorbing or motoring operation may be used to indicate the condition of torque loading. In practice, the rotor shaft of the dynamometer is connected to a rotatable device such as the test unit TU indicated in block outline. For example, such a device may be an internal combustion engine, a shaft of a transmission assembly, a shaft of an axle assembly, or it may be a rotatable drum assembly adapted to receive the rear wheels of a vehicle for chassis tests. Such devices are not shown in the interest of simplicity.

A generator G, which may be driven by a suitable induction motor (not shown), in keeping with conventional practice, is provided with a single field winding designated GF. The armature winding of the generator is connected in a series loop with the armature winding of the dynamometer forming a variable voltage drive. The generator is driven at constant speed by the induction motor referred to above which conventionally is supplied from a suitable source of three-phase alternating-current voltage. The armature circuit of the dynamometer and generator is controlled by a switch generally designated M, which in a practical system may be adapted for automatic control by conventional controls used for this purpose.

The generator field GF is controlled by a generator exciter generally designated GE. This exciter, as indicated by the broken line, is mechanically connected with the generator G and driven therewith. The exciter, in turn, is controlled by a pair of differentially related field windings GEF1 and GEF2, respectively. Winding GEF1 is supplied with direct-current voltage of suitable magnitude which may be adjustable for some predetermined constant value as required. The ampere turns of this field, for the purposes of this discussion, may be assumed to be in such sense as to increase the exciter voltage and, hence, the output voltage of the generator so as to drive the dynamometer D in the direction required by the test unit TU, for example, in a direction to crank the test engine or, stated otherwise, in the direction in which the test engine normally runs. Exciter field GEF2 which is differentially related to the exciter field GEF1 is supplied with direct-current voltage from a load rectifier LR which is of the full-wave type. This rectifier constitutes the load rectifier in the output circuit of a magnetic amplifier generally designated MA.

The dynamometer field winding DF is supplied by the output of a dynamometer exciter generally designated DE which is provided with a field winding designated DEF. This field winding is controlled in excitation by a potentiometer type of rheostate P3 which is connected to and in circuit with the field winding DEF for the dynamometer exciter across a suitable supply of direct-current voltage represented in conductors EP and EN, in turn supplied by a constant potential direct-current exciter generally designated CPE. This exciter is also adapted for constant speed operation by means of a suitable drive motor, not illustrated in the interest of simplicity.

The magnetic amplifier MA is of the parallel-connected doubler type comprising two magnetic amplifier sections generally designated MA1 and MA2, each having main windings M1 and M2. These main windings are polarized by means of respective self-saturating rectifiers SS1 and SS2 forming part of the main winding circuits. Energization for the main winding circuits is provided by a transformer T1 having a primary T1P adapted for connection to a suitable conventional supply of alternating-current and a center tapped secondary winding T1S, the respective tapped sections of which are connected in closed circuit relation with the main winding circuits, including respective main windings M1 and M2. The output of the main winding circuits appearing between the common terminal of the self-saturating rectifiers and the center tap of the secondary winding T1S is applied across the alternating-current terminals of the load rectifier LR, and the direct-current terminals of this full-wave rectifier are connected across the generator exciter field winding GEF2.

The output of the magnetic amplifier assembly is controlled by a plurality of control windings on the respective magnetic amplifier sections. These windings comprise respective bias windings B1 and B2 which are energized from a suitable supply of direct current, respective speed regulating windings SR1 and SR2, respective load windings L1 and L2, respective current limit windings CL1 and CL2, respective rate-of-change of armature current feedback windings RC1 and RC2, respective voltage regulating windings VR1 and VR2, and respective rate-of-change of voltage feedback windings RV1 and RV2.

For the assumed differential relationship of the generator exciter field windings GEF1 and GEF2, a condition of zero armature current is obtained in the motor generator armature loop when the differential ampere turns of winding GEF2 are exactly equal to those of the winding GEF1. For this condition to be achieved with the arrangement indicated, the magnetic amplifier assembly is biased by means of the bias windings B1 and B2, respectively, to a suitable point on its magnetic characteristic such that its output current, represented in the output of the load rectifier LR, produces sufficient ampere turns in winding GEF2 to neutralize those of the winding GEF1, which condition, for the purposes of this discussion, will be assumed to produce a condition of zero output at generator G. Thus, the function of the remaining control windings on the magnetic amplifier, which are employed under any particular operating condition, will be that of shifting the operating point of the magnetic amplifier on its magnetic characteristic to provide output current for the differential field winding GEF2 so as to maintain a selected operating condition with respect to the dynamometer.

One of the amplifier input voltages is a speed error voltage. This voltage is derived from the difference between an adjustable reference voltage and a voltage produced by a tachometer generator or pilot generator generally designated PG, which is indicated by the broken line as connected to and driven by the dynamometer D. The adjustable reference voltage is derived across a tapped portion of a potentiometer P4, energized across the constant potential conductors EP and EN. The voltage tapped from potentiometer P4 is combined in series opposition with the pilot generator voltage in a circuit including the control windings SR1 and SR2 of the magnetic amplifier. In this arrangement, the polarity of the speed reference voltage tapped from potentiometer P4 is such as to produce ampere turns in windings SR1 and SR2, respectively, that produce fluxes in the respective magnetic cores in opposition to the flux of the respective main windings M1 and M2; that is, to produce a desaturating flux to increase the effective impedance of the main winding circuits and so reduce the output of the magnetic amplifier. The net excitation of the generator exciter is then in such sense as to drive the generator voltage upwardly; that is, in a direction to operate the dynamometer to drive the test unit in the direction required. The voltage output of the pilot generator being differential with respect to that tapped from the speed potentiometer P4, produces ampere turns in windings SR1 and SR2 in such sense as to increase the saturation of the respective magnetic amplifier cores, thus tending to drive the output of the main winding circuits upwardly so that the ampere turns of the differential field tend to predominate.

In the motoring mode of operation, therefore, a small differential voltage between the speed potentiometer voltage and the pilot generator voltage in favor of the speed potentiometer voltage will appear producing just sufficient ampere turns to maintain the required net excitation in favor of winding GEF1 so that the dynomometer may be operated as a motor. When the test engine is started and functions as a motor tending to drive the dynamometer D, the pilot generator voltage tends to increase. This tends to reduce the excitation of windings SR1 and SR2 which allows the output of the magnetic amplifier to increase reducing the differential excitation of the generator exciter and, in turn, reducing the generator voltage. In this absorbing mode of operation the armature current is reversed and this reduction in generator voltage allows the armature current in the generator dynamometer loop to increase which increases the torque to thereby tend to hold the speed at the value selected by the setting of potentiometer P4. Thus, it will be appreciated that adjustment of the tap of potentiometer P4 establishes the speed which is to be maintained by the dynamometer to produce the necessary tachometer voltage to attain equilibrium in the speed regulating loop. By this means, selected constant dynamometer speeds are obtained for both motoring and load-absorbing operation.

To minimize the effect of load swings on the system, by limiting the magnitude of the speed-error which may be fed back through the control windings SR1 and SR2, and thereby relieve the burden on the current limiting circuits yet to be described, a speed-error limiting circuit may be provided to shunt excessive speed-error voltages from the magnetic amplifier control winding circuits. This may comprise a full-wave type of rectifier herein referred to as a speed-error rectifier generally designated SER, having its alternating-current terminals connected across the series connected magnetic amplifier control windings SR1 and SR2. The direct-current terminals of this rectifier are biased by a suitable supply of direct current herein conveniently represented as a battery B1. With the arrangement described, voltages applied to the full-wave rectifier in excess of the bias of battery B1 overcome the battery bias and are shunted from the control windings SR1 and SR2. In view of the use of a full-wave type of rectifier, it will be appreciated that excess speed-error voltages of either polarity are conveniently handled in this shunt circuit.

System protection is achieved by current limiting through the production of a current limit voltage derived from motor armature current. Such a voltage is produced across a resistor R1 which is connected in series in the armature circuit of the dynamometer and generator. This voltage is applied to respective current limit windings CL1 and CL2, and the value at which armature current is to be limited is determined by means of a full-wave current limit rectifier CLR having its direct-current terminals negatively biased by means of a battery B2. Thus, the current limit action is prevented from taking place until such time as the voltage developed across the armature current resistor R1 exceeds the blocking bias on full-wave rectifier CLR provided by the battery B2. These windings are so selected that their ampere turns in current limiting action swamp the control afforded by the other active control windings on the magnetic amplifier to effectively limit the armature current at the selected value. The current limiting action may be shunted from the circuit for operations involving load control yet to be described, by the simple expedient of shunting the rectifier with a load contactor herein designated LS2, the purpose of which will be explained at a later point.

Load control is achieved through the action of respective load windings L1 and L2 on the magnetic amplifier. The connection of these windings is controlled by means of a switch LS1 which is mechanically ganged with switch LS2 which shunts the current limiting characteristic. Load windings L1 and L2 are energized in series by the voltage tapped from a load potentiometer P1 energized across the constant voltage direct-current supply conductors EP and EN. The ampere turns of the load windings L1 and L2 are poled in a sense to desaturate the respective cores. As in the case of the speed regulating windings SR1 and SR2, this drives the output of the magnetic amplifier downwardly which produces net excitation of the generator exciter GE in such sense as to tend to increase the output of the generator G. In the motoring mode of operation, and with contacts LS2 closed shunting the current limit rectifier bias, the armature current is in such a direction as to produce a voltage drop across the armature circuit resistor R1 that the ampere turns of current limit windings CL1 and CL2 oppose the ampere turns of load windings L1 and L2. Thus, in the motoring mode, the generator voltage is maintained at such level by the net ampere turns between the load and current limit windings on the magnetic amplifier as to maintain the armature current magnitude selected at the tap of load potentiometer P1. This tends to maintain a substantially constant torque output of the dynamometer D, in view of the proportionality between torque and current in the direct-current dynamometer. For this mode of operation, the contacts of the switch S are open, the contacts S3 opening the speed regulating circuit, which eliminates the speed control function during the load mode of operation.

Generator armature voltage regulation is obtained by means of voltage regulating control windings VR1 and VR2 on the respective amplifiers. The voltage applied to these windings is the differential of the voltage tapped from a potentiometer P2 energized across the constant direct-current supply circuits EP and EN and a voltage responsive potentiometer or resistor R2 which is connected across the armature winding of the generator G, independently of the switch M, in the armature circuit. Thus, the resistor R2 provides a closed loop around the generator armature whenever the armature loop is open. In this control of the windings VR1 and VR2, the ampere turns produced by the voltage tapped from the voltage reference potentiometer P2 are such as to tend to desaturate the respective magnetic cores to lower the output of the magnetic amplifier, while the ampere turns due to the voltage tapped from resistor R2 across the generator armature tend to increase core saturation to increase the output of the magnetic amplifier. The net voltage is such as required to maintain that amplifier output which produces the magnitude of generator voltage selected at the tap of voltage reference regulating potentiometer P2. This voltage circuit is controlled by the contacts S1 of the switch S.

To stabilize the speed loop, the rate of change of armature current is fed back to control windings RC1 and RC2 respectively, and the armature current damping loop is stabilized by feeding back the rate-of-change of generator exciter voltage to the windings RV1 and RV2 respectively. The rate of change of current feedback is derived from the output of a transformer T2 having a primary T2P connected across the armature circuit resistor R1. The secondary winding T2S of this transformer is connected across the series connected magnetic amplifier windings RC1 and RC2 through the contacts S2 of the switch S. The generator exciter voltage is taken directly from the terminals of the armature winding of the generator exciter GE, and is applied to the series connected windings RV1 and RV2. The generator exciter voltage is differentiated by means of an RC circuit comprising a capacitor C and a resistor R3 in series. It will be appreciated that the ampere turns provided by these windings on the magnetic amplifier are such as to damp the operation of the amplifier, and their respective ampere turns are reversible depending upon whether the armature current and the generator exciter voltage are increasing or decreasing respectively.

The potentiometers P2, P3, and P4 are mechanically ganged as indicated by the broken lines connecting the respective taps of these potentiometers. In the case of the voltage and speed potentiometers P2 and P4, movement of the taps upwardly, as viewed, increases the voltages tapped therefrom to correspondingly increase the conditions which these respective potentiometers control in the system; namely, the generator armature voltage and the system speed, respectively. It will be noted that potentiometer P2 is blanked over its upper range. The end of the resistance portion of this potentiometer represents the point of 100% generator armature voltage which corresponds to the upper range of speed control achievable by means of armature voltage regulation. This may be refered to as the base speed of the dynamometer D. Beyond this point, further adjustment of potentiometer P2 has no further effect upon the generator armature voltage which, therefore, tends to remain constant. This base speed may correspond approximately to about 40% to 50% of the total speed range of the motor achievable with the control arangement herein provided. Speed increases beyond base speed are achieved by means of weakening of the dynamometer field DF through weakening of the dynamometer exciter voltage. Over the base speed range of adjustment of potentiometer P2, potentiometer P3 is blanked. Beyond this range, when the generator armature voltage remains substantially constant, resistance is inserted in the dynamometer exciter field to thereby lower its voltage and current and correspondingly reduce the output of the dynamometer exciter DE to weaken the dynamometer field DF. For the assumed conditions, therefore, the remaining 50% to 60% of the full-speed of the dynamometer D is achieved through field weakening of the dynamometer field. By ganging potentiometer P4, which is the speed reference potentiometer for the system, with potentiometers P2 and P3, a speed reference over the entire speed range, above described, is obtained. Thus, the pilot generator at all times is working against a voltage which is tapped from the speed potentiometer P4 so that in the speed regulating mode, a speed signal corresponding to selected speed is obtained.

For certain conditions of operation, it is desirable to crank the test unit TU, which is assumed to be a test engine, so that it may be started, after which the test engine is to be run substantially unloaded except for the flywheel loading of the dynamometer thereon. This is accomplished after the test engine is running, preferably at some low speed, by electrically unloading the dynamometer through opening of switch M to open the armature circuit of the dynamometer and generator. Thus, the desired tests may be made on the test engine with only the flywheel effect of the dynamometer on the test engine. It will be observed, however, that in this mode of operation, the field of the dynamometer exciter is approximately at maximum excitation and, consequently, the field of the dynamometer is also approximately at maximum excitation. Although the armature loop is open, a voltage exists across the armature terminals of the dynamometer which, if not suitably matched to the generator voltage at the time of reclosing of the switch M, may cause very substantial current surges in the armature loop.

In prior arrangements, it has been necessary to shut the system down before reclosing of the armature circuit could be safely effected. But, in this arrangement, provision is made for regulating the generator voltage with the generator dynamometer armature loop open. This is accomplished in the circuit arrangement previously described including the resistor R2 and the voltage reference potentiometer P2. Since the generator armature loop is closed, even when the switch M is open, by the resistor R2, it will be appreciated that the control loop, including the voltage regulating windings VR1 and VR2 on the respective magnetic amplifier sections coupled with the reference voltage tapped at potentiometer P2, provides a means for regulating the generator armature terminal voltage. The voltage difference between the generator armature voltage and the dynamometer armature voltage, now functioning as the generator, may be measured when switch M is opened by means of a voltmeter V connected across the switch terminals. Thereafter, the tap of the voltage reference potentiometer may be adjusted until such time as the voltmeter reads zero, indicating that the generator and dynamometer armature voltages are properly matched so that the armature loop may be safely closed. Thus, provision is made for expeditiously reclosing the armature loop without shutting the system down, saving considerable time in test procedures.

If circumstances justify the additional costs and complexities, it is feasible to provide an automatic control of the generator armature voltage in this mode of operation. This may be conveniently accomplished by means of a position servo of conventional type designated PS and indicated only in block form. Such a servo may be any conventional type of two-phase motor servo, the input of which is derivable from a voltage supply such as existing across the open contacts of the switch M, and the output of which is of a mechanical nature capable of driving the ganged potentiometers so that the voltage reference at contact P2 may be adjusted to provide correspondence between the generator and dynamometer armature voltages.

*Motoring—Speed regulation*

Speed regulation in the motoring mode of dynamometer operation is achieved with switch L open and switch S closed. Contacts S1 of the switch S close the voltage reference loop in the magnetic amplifier, contacts S2 close the rate of change of armature current loop in the magnetic amplifier, and contacts S3 close the speed regulating loop. With this arrangement, speed is held at some substantially constant value with the voltage of the generator regulated by the voltage reference circuit and the speed regulating loop stabilized by the feedback of the rate-of-change of armature current. In the motoring mode of operation the dynamometer D operates as a motor, and the speed is regulated by the differential voltage between the voltages tapped at potentiometer P4 and the pilot generator voltage, this voltage being in favor of the voltage at potentiometer P4 and tending to drive the output of the magnetic amplifier downwardly sufficiently to maintain the speed at the selected value. Similarly, the differential voltage in the voltage regulating loop is predominantly that due to the voltage tapped from voltage reference potentiometer P2 and also tends to drive the output of the magnetic amplifier downwardly by that amount required to maintain the voltage established at the tap of the voltage reference potentiometer. Current limiting in this mode of operation is effected at such time as the voltage drop across the armature circuit resistor R1 exceeds the bias of the battery B2 on the direct-current terminals of the full-wave rectifier CLR, it being remembered in this mode that contacts LS2 are open. The function of the current limit in this mode of operation is such as to drive the output of the magnetic amplifier up to reduce the differential ampere turns in the generator exciter excitation field system to reduce the generator output and so limit the motor armature current. As will be recalled, this is an overriding control which results in swamping of the other controls effected by the remaining active control windings on the magnetic amplifier.

*Motoring—Load regulation*

In this mode of operation, the switch S is open and the switch L is closed. Closing of switch L applies the load windings L1 and L2 to the control of the magnetic amplifier and closing of contact LS2 shunts the current limiting action of the current limiting rectifier CLR and its biasing battery from the current limit windings CL1 and CL2 so that these function now as direct-current feedback windings. In the motoring mode of operation, the load current in the armature loop circulates in such a direction that the current limit winding ampere turns tend to oppose the load winding ampere turns in the magnetic amplifier. The load winding ampere turns are in such sense as to tend to desaturate the cores of the respective magnetic amplifier sections to reduce the output of the magnetic amplifiers. Thus, the current feedback in this instance is in such sense as to reduce the desaturating load ampere turns to permit a rise in magnetic amplifier output reducing the differential excitation of the exciter to correspondingly reduce the generator armature current. Thus, a net differential excitation is achieved which corresponds to the setting of the load potentiometer P1. Departures of armature current above and below this selected value correspondingly regulate the output of the generator G to hold the load current substantially constant. This is the operating mode which is used for constant torque testing of a test engine, for example.

*Absorbing—Speed regulation*

In this mode, the switch S is again closed and the switch L is open. The test engine is now driving the dynamometer D as a generator and, consequently, the armature current in the generator dynamometer armature winding loop is reversed from that in the motoring mode. The speed regulating and voltage regulating portion of the system functions the same in the absorbing mode as in the motoring mode. Rising dynamometer speed again reduces the net excitation of the exciter to correspondingly reduce the generator armature voltage. This reduction in generator armature voltage permits a rise in the absorbing armature current which correspondingly increases the dynamometer torque which, for a given setting of the throttle of the test engine, tends to drop the test engine speed to the preset value determined by the setting of speed potentiometer P4. In this absorbing mode of operation, the current limit control is effective again to limit the armature current. In this case, however, since the armature current is reversed, the voltage across the armature circuit resistor R1 is reversed which reverses the ampere turns of the current limit windings CL1 and CL2. This reversal in ampere turns now acts in such sense as to reduce the output of the magnetic amplifier increasing the differential excitation of the exciter and increasing the armature voltage of generator G. This increase in armature voltage, it will be appreciated, limits the absorbing current in the armature loop.

*Absorbing—Load regulation*

As in the case of load regulation in the motoring mode, the switch S is open and the switch L is closed. This eliminates the voltage reference feedback, the rate-of-change of armature current feedback and the speed-error feedback from the control. In the absorbing mode, as pointed out above, the armature current is reversed. The polarity of the load windings L1 and L2 is again such as to drive the magnetic amplifier output down to increase the net excitation of the exciter and, consequently, increase the output of the generator G. The reversed armature current results in reversal in excitation of the current limit windings CL1 and CL2. The ampere turns of these windings now aid the ampere turns of the load windings L1 and L2. Thus, any increase in armature current results in an increase in generator armature voltage which tends to limit the armature current in the absorbing direction. A drop in armature current, of course, results in an increase in the output of the magnetic amplifier to reduce the differential excitation of the exciter and to correspondingly reduce the output of the generator armature which, in turn, permits a rise in the absorbing current. Thus, the absorbing current is maintained at some substantially constant value.

It will be appreciated from the foregoing considerations, that the various objects of this invention have been accomplished in a simple and expeditious manner in the control system and apparatus herein provided. The magnetic amplifier provides a durable and simple type of amplifier arrangement, which has a long life expectancy when operated within its normal range. This is conveniently accomplished by proper selection of the system components. It will also be appreciated that the provision of the voltage regulating loop for the generator considerably simplifies the operation of the system. The magnetic amplifier arrangement, of course, is susceptible of considerable modification. For example, in place of utilizing the differential field windings on the generator exciter GE, the magnetic amplifier arrangement may be elaborated to provide a push-pull arrangement controlling the excitation of a single field winding on the exciter. With such an arrangement, the outputs of the respective magnetic amplifiers are normally balanced so that zero excitation on the exciter field exists. If the amplifiers are operated class "A," reduction in output of one and a corresponding increase in output of the other then controls the direction and magnitude of excitation of the exciter. Further modifications may be achieved in the provision of speed-slope control for the system to simulate up-grade and down-grade conditions for complete chassis tests on an automobile, for example. Such an arrangement as this could be conveniently accomplished by modifying the load or torque control achieved in the system by adding or subtracting a portion of the voltage of the pilot generator PG in the load regulating loop including the potentiometer P1. If this voltage is added in series with the voltage of the potentiometer P1, it will be observed that a rising torque characteristic with speed will be obtainable. If this voltage is opposed to the voltage tapped at the load potentiometer, then a dropping speed characteristic will be obtained. The linear relationship of these two voltages results, of course, in a linear slope in each case.

These and other expedients will be readily apparent to those skilled in the art. Accordingly, it is intended that the foregoing disclosure and the showings in the drawing shall be considered only as illustrative of the principles of this invention and not construed in a limiting sense.

I claim as my invention:

1. Dynamometer apparatus comprising, a direct current dynamo having an armature winding and a field winding, said direct current dynamo being coupled to a test motor means to be driven thereby in a first mode of operation to function as an inertial load and in a second mode of operation to function as an absorbing generator, a separately driven generator having an armature winding and a field winding, circuit means including a switch connecting said generator armature winding to said dynamo armature winding, circuit connections for applying excitation current to said dynamo field winding, an impedance device connected across said generator armature winding independently of said switch and having a voltage thereacross proportional to generator armature winding voltage, an adjustable reference voltage impedance device, circuit means differentially connecting said impedance devices to control excitation of said generator field winding, said switch being open in said first mode of operation and said direct current dynamo having an armature output voltage proportional to the speed of operation thereof, and means connected across said switch to be energized in dependence of the difference between the dynamo voltage and the generator voltage for indicating the difference between dynamo voltage and generator voltage, said means connected across said switch being connected to control said adjustable reference voltage impedance device so that the generator voltage may be adjusted to equal said dynamo voltage prior to closing of said switch to initiate said second mode of operation.

2. Dynamometer apparatus comprising, a direct current dynamo having an armature winding and a field winding, said direct current dynamo being coupled to a test motor means to be driven thereby in a first mode of operation to function as an inertial load and in a second mode of operation to function as an absorbing generator, a separately driven generator having an armature winding and a field winding, circuit means including a switch connecting said generator armature winding to said dynamo armature winding, circuit connections for applying excitation current to said dynamo field winding, an impedance device connected across said generator armature winding independently of said switch and having a voltage thereacross proportional to generator armature winding voltage, an adjustable reference voltage impedance device, circuit means differentially connecting said impedance devices to control excitation of said generator field winding, said switch being open in said first mode of operation and said direct current motor having an armature output voltage proportional to the speed of operation thereof, and servo means having an input circuit connected across said switch to be energized in dependence of the difference between generator voltage and dynamo voltage and having a mechanical output connected to drive said adjustable reference voltage device for substantially matching said generator voltage to said dynamo voltage across said switch.

3. Dynamometer apparatus comprising, a direct current dynamo having an armature winding and a field winding, said direct current dynamo being coupled to a motor to be tested to drive said motor in one mode of operation and to be driven by said motor in a second mode of operation, a separately driven generator having an armature winding and a field winding, circuit means including a switch connecting said generator armature winding to said motor armature winding, said switch being open in said second mode of operation, generator field circuit means, impedance means connected across said generator armature winding independently of said switch and forming a closed impedance circuit with said generator armature winding, adjustable voltage reference means, and circuit means differentially electrically connecting said voltage reference means and said impedance means to control said generator field circuit means to energize the field winding of said generator whereby the voltage of said generator may be controlled whether said switch is opened or closed.

4. Dynamometer apparatus comprising, a direct current dynamo having an armature winding and a field winding, said direct current dynamo being coupled to a motor to be tested to drive said motor in one mode of operation and to be driven by said motor in a second mode of operation, a generator having an armature winding and a field winding, circuit means including a switch connecting said generator armature winding to said dynamo armature winding, said switch being open in said second mode of operation, impedance means connected across said generator armature winding independently of said switch and forming a closed impedance circuit with said generator armature winding, and voltage regulating means including at least a portion of said impedance means and connected with said generator field winding for regulating generator voltage independently of the position of said switch.

5. An electric dynamo control system comprising, a direct current dynamo having an armature winding and a field winding, a separately driven direct current generator having an armature winding and a field winding, circuit means connecting the generator armature winding to energize said dynamo armature winding, means including a magnetic amplifier having a main winding circuit connected to energize said generator field winding and having a control winding, means for producing a voltage proportional to dynamo speed, means for producing a speed reference voltage, circuit means differentially connecting said voltages to said control winding of said magnetic amplifier, and a shunting circuit connected across said control winding of said magnetic amplifier and arranged to pass current therethrough when the differential of said voltages exceeds a given value.

6. An electric dynamo control system comprising, a direct current dynamo having an armature winding and a field winding, a separately driven direct current generator having an armature winding and a field winding, circuit means connecting the generator armature winding to energize said motor armature winding, means including a magnetic amplifier having a main winding circuit connected to energize said generator field winding and having a control winding, means for producing a voltage proportional to dynamo speed, means for producing a speed reference voltage, circuit means differentially connecting said voltages to said control winding of said magnetic amplifier, a rectifier circuit connected across said control winding of said magnetic amplifier and poled to pass current therethrough in parallel with said control winding of said magnetic amplifier, and means for applying an electrical blocking bias to said rectifier.

7. An electric dynamo control system comprising, a direct current dynamo having an armature winding and a field winding, a separately driven direct current generator having an armature winding and a field winding, circuit means connecting the generator armature winding to energize said dynamo armature winding, means including a magnetic amplifier having a main winding circuit connected to energize said generator field winding and having a control winding, means for producing a voltage proportional to dynamo speed, means for producing a speed reference voltage, circuit means differentially connecting said voltages to said control winding of said magnetic amplifier, and an electrically biased polarized circuit connected across said control winding of said magnetic amplifier and poled to pass current therethrough in parallel with said magnetic amplifier control winding when the differential of said voltages exceeds said electrical bias.

8. An electric dynamo control system comprising, a direct current dynamo having an armature winding and a field winding, a separately driven generator having an armature winding connected to said dynamo armature winding, excitation means for said generator including a pair of field windings, means for exciting one field winding with a given value of direct current, a magnetic amplifier having a main winding circuit connected to differentially energize the other of said pair of field windings with respect to said one field winding and having a control winding, a pilot generator driven by said dynamo for producing a voltage proportional to dynamo speed, an adjustable speed reference voltage device, circuit means differentially connecting said pilot generator and said speed reference voltage device to said magnetic amplifier control winding to energize said control winding in dependence of the difference of the speed reference voltage and speed proportional voltage, the polarity of the difference of said voltages depending upon which of said voltages is the greater; full wave rectifier means having the input terminals thereof connected across said magnetic amplifier control winding, and means for applying a direct current voltage as a blocking voltage across the direct current terminals of said full wave rectifier.

References Cited in the file of this patent

UNITED STATES PATENTS

| | | |
|---|---|---|
| 2,417,745 | Findley | Mar. 18, 1947 |
| 2,660,699 | Helot | Nov. 24, 1953 |

OTHER REFERENCES

Text: Basic Electrical Engineering, A. E. Fitzgerald, McGraw-Hill, New York, 1945.